(12) United States Patent
Clever et al.

(10) Patent No.: US 11,279,027 B2
(45) Date of Patent: Mar. 22, 2022

(54) METHOD FOR ESTIMATING A WRENCH

(71) Applicant: ABB Schweiz AG, Baden (CH)

(72) Inventors: Debora Clever, Zwingenberg (DE); Fan Dai, Zwingenberg (DE); Hao Ding, Heidelberg (DE); Tomas Groth, Vaesteras (SE); Bjoern Matthias, Bad Schoenborn (DE); Arne Wahrburg, Darmstadt (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/169,575

(22) Filed: Feb. 8, 2021

(65) Prior Publication Data
US 2021/0162596 A1 Jun. 3, 2021

Related U.S. Application Data

(63) Continuation of application No. PCT/EP2018/071631, filed on Aug. 9, 2018.

(51) Int. Cl.
*B25J 9/16* (2006.01)

(52) U.S. Cl.
CPC ........... *B25J 9/1633* (2013.01); *B25J 9/1653* (2013.01); *G05B 2219/39261* (2013.01); *G05B 2219/39264* (2013.01); *G05B 2219/39319* (2013.01)

(58) Field of Classification Search
CPC ...... B25J 9/1633; B25J 9/1653; B25J 9/1605; G05B 2219/39261; G05B 2219/39264; G05B 2219/39319; G05B 2219/39343; G05B 13/04; G05B 2219/42153; G05B 2219/39286; G05B 2219/39326; G05B 2219/40525; G05B 2219/39061
See application file for complete search history.

(56) References Cited

U.S. PATENT DOCUMENTS

| 2011/0060460 A1* | 3/2011 | Oga | B25J 9/1633 |
| | | | 700/254 |
| 2014/0379126 A1* | 12/2014 | Ueberle | B25J 9/1676 |
| | | | 700/245 |
| 2017/0008171 A1 | 1/2017 | Iwatake | |

FOREIGN PATENT DOCUMENTS

| JP | 03117582 A | 5/1991 | |
| WO | WO-2016110320 A1 * | 7/2016 | ............ B25J 9/1633 |

OTHER PUBLICATIONS

Wahrburg Arne et al.: "Cartesian contact force estimation for robotic manipulators using Kalman filters and the generalized Momentum" 2015 IEEE International Conference ON Automation Science and Engineering (CASE), Aug. 24, 2015, pp. 1230-1235, IEEE, Gothenburg, Sweden.

* cited by examiner

*Primary Examiner* — Dale Moyer
(74) *Attorney, Agent, or Firm* — Leydig, Voit & Mayer, Ltd.

(57) ABSTRACT

A method for estimating a wrench acting on a reference point of a robot includes the steps of: a) measuring at least one component, but not all components, of the wrench; and b) estimating non-measured components of the wrench based on a dynamical model of the robot while taking into account the measured components.

12 Claims, 1 Drawing Sheet

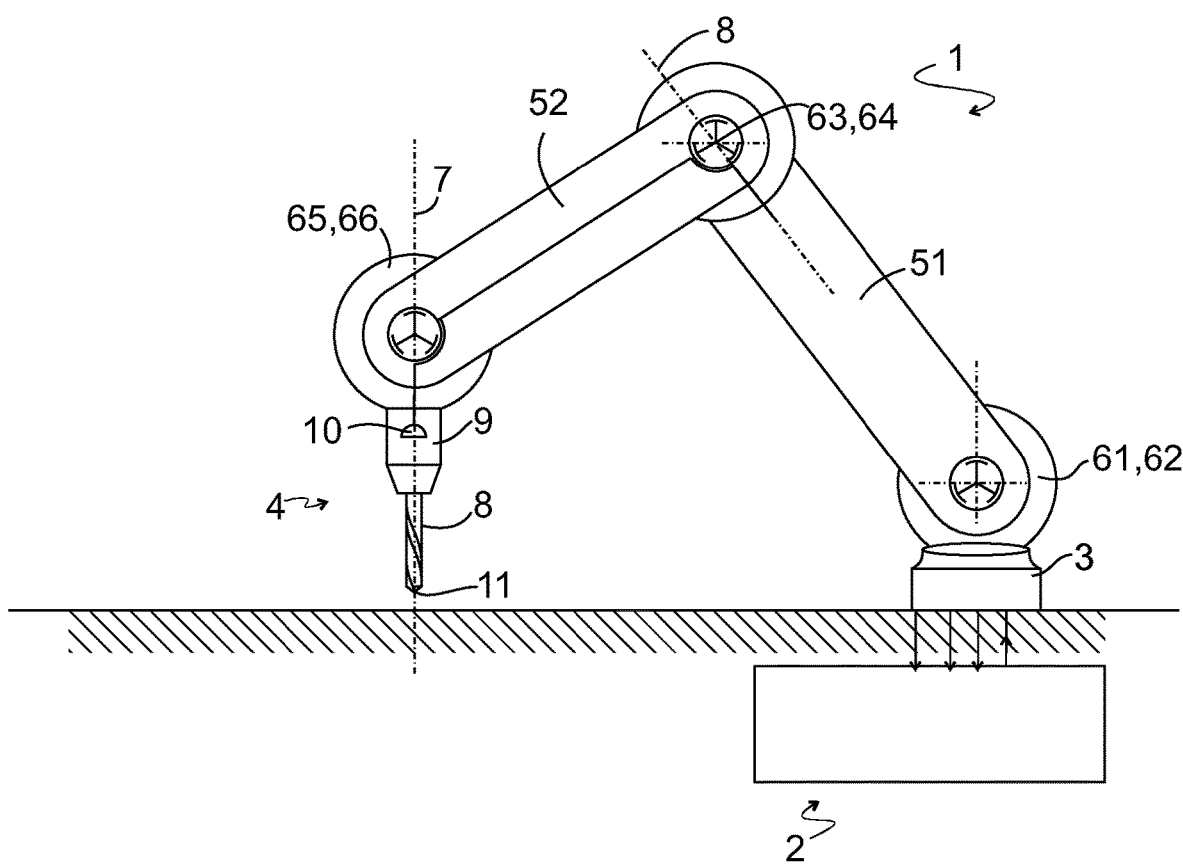

METHOD FOR ESTIMATING A WRENCH

CROSS-REFERENCE TO PRIOR APPLICATION

This application is a continuation of International Patent Application No. PCT/EP2018/071631, filed on Aug. 9, 2018, the entire disclosure of which is hereby incorporated by reference herein.

FIELD

The present invention relates to a method for estimating a wrench acting on a reference point of a robot, such as its tool center point, TCP.

BACKGROUND

In robotics, a wrench is a six-dimensional vector, of which three components describe a force acting on the reference point, and three more component define a torque which is applied to said same point.

If industrial robots are to operate in a force-controlled manner, they are typically equipped with a 6 degrees of freedom (DOF) force/torque (F/T) sensor that measures both contact forces in three translational directions and contact torques about all three axes. Based on this information, the contact forces and torques can actively be controlled in one or several directions, e.g. for assembly, grinding, or polishing. While 6 DOF F/T measurement provides high quality F/T information, the sensors that are required for the purpose are expensive.

As an alternative to measuring, contact forces and torques can also be estimated based on a dynamic model of the robot. Such estimation of forces and torques requires no force and torque sensors; the only input that is required are data that define angles of the various joints of the robot, and data on motor current or any other data from which motor torque can be calculated. Since these data are needed for controlling any movement of the robot, force-controlled or not, devices that provide them are generally present in a robot system and can be used for providing input to the dynamic model at no further cost.

The quality of the estimated forces and torques depends heavily on the precision with which the dynamic model of the robot allows to predict friction in the joints of the robot. This prediction can be difficult, since there are many parameters of the robot which have an influence on friction but which may not all be known, or which cannot be measured or predicted with the desired precision.

SUMMARY

In an embodiment, the present invention provides a method for estimating a wrench acting on a reference point of a robot, comprising the steps of: a) measuring at least one component, but not all components, of the wrench; and b) estimating non-measured components of the wrench based on a dynamical model of the robot while taking into account the measured components.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 is a schematic view of a robot system to which the invention is applicable.

DETAILED DESCRIPTION

In an embodiment, the present invention provides a method for estimating a wrench which can achieve a high precision at low cost.

In an embodiment, the present invention provides a method comprising the steps of
  a) measuring at least one, but not all components of the wrench, typically using a built-in sensor of the robot, and
  b) estimating non-measured components of the wrench based on a dynamical model of the robot while taking the measured components into account.

The cost of implementing the method can be kept low not only because the overall number of sensors can be reduced in comparison with the 6 DOF F/T measurement approach, but also because the component(s) of the wrench that are chosen to be measured can be the one (s) which offer the best ratio of cost to efficiency.

For example, measuring a force may be preferable over measuring a torque since a precise torque measurement may require a certain distance between a force-sensitive element and an axis relative to which the torque is measured, while a force measurement does not, so that a force sensor can fit into a smaller space.

From the viewpoint of cost and efficiency, no additional sensor can improve the precision of the wrench estimation more than the first sensor does. Therefore, in a preferred embodiment, the number of measured components is 1.

Further, it is preferred that the measured component is parallel to a surface normal of a surface of the robot which extends through the reference point. In that way, a contact force between the robot and an outside object touching the surface can be measured precisely, and there is no risk of the measurement being distorted by the object slipping along the surface. Alternatively, it can be parallel to a direction in which the reference point advances when processing a workpiece, so that during processing, pressure exercised on the workpiece can be measured precisely.

There are various approaches by which the measured component(s) can be taken account of.

One of these is to estimate the non-measured components by a maximum-likelihood estimation, i.e. by finding those values of the non-measured components for which the likelihood of measuring the values of the measured components that actually were measured is highest.

Another is based on the principle of the Kalman filter. A Kalman filter can be set up having the coordinates and speeds of the robot in the various degrees of freedom as its state. The at least one measured component is input as a state measurement into said Kalman filter, so that it will be taken into account when a future state is predicted based on the measured state of the Kalman filter.

Still another approach comprises, as substeps of step b), steps of calculating a first estimate of the wrench based on the dynamical model alone, and of refining the first estimate using a maximum-aposteriori estimation.

Further features and advantages of the invention will become apparent from the following description of embodiments thereof, referring to the appended drawing.

The robot system of FIG. 1 comprises a robot arm 1 and an associated controller 2. The robot arm 1 comprises a base 3, an end effector 4, an arbitrary number of links 5$i$, $i=1$, 2, ... and joints 6$j$, $j=1, 2, \ldots$ which connect the links 5$i$ to each other, to the base 3 or to the end effector 4. For the sake of simplicity it will be assumed here that each joint has one degree of rotational freedom, i.e. is rotatable around a single axis 7. A given link 5$i$ can be rotatable with respect to a neighbouring link 5 ($i+1$) or 5 ($i-1$) about two different axes; in that case—although the connection might in practice be formed by a single ball joint—it will be assumed here that the links are connected by two joints, each having one degree of rotational freedom.

Each such joint 6$j$ comprises a motor to drive its rotation and a rotational encoder for feeding back the rotation angle of the joint 6$j$ to controller 2.

The end effector 4 is a tool of any desired type, such as a gripper, a welding or soldering tool, a machining tool, a grinding tool etc., or, in the example of FIG. 1, a drill. The drill comprises a drilling head 8 and a socket 9 in which the drilling head 8 is removably mounted and is rotatably driven around an axis 7 and advances along axis 7 during drilling. The socket 9 accommodates a force sensor 10 which is designed to detect a force component along axis 7.

As is well known, external forces and torques at a tool center point (TCP) 11 such as the tip of drilling head 8 induce joint load torques according to $$\tau_{ext} = J^T f \quad (1)$$

where $J \in \mathbb{R}^{6 \times N_{DoF}}$ the manipulator TCP Jacobian with respect to the base frame. We partition the wrench $f \in \mathbb{R}^6$ into $f = f_m + f_{nm}$, where $f_m$ contains the components that can directly be measured by available low-dimensional sensors of the robot, i.e. by sensor 10 in the case of FIG. 1, and $f_{nm}$ contains components which cannot be measured because the robot arm 1 lacks appropriate sensors. Assuming that the direction of axis 7 is the z direction, $f_m$ and $f_{nm}$ can be written $$f_m = \begin{bmatrix} 0 \\ 0 \\ f_{m,z} \\ 0 \\ 0 \\ 0 \end{bmatrix}, \quad f_{nm} = \begin{bmatrix} f_{nm,x} \\ f_{nm,y} \\ 0 \\ \tau_{nm,x} \\ \tau_{nm,y} \\ \tau_{nm,z} \end{bmatrix} \quad (2)$$

Replacing f by $f_m + f_{nm}$ in eq. (1), we can write $\tau_{ext} = J^T (f_n + f_{nm})$, and we define $$\tau'_{ext} = \tau_{ext} - J^T f_n = J^T f_{nm} \quad (3)$$

Since $f_{nm}$ has at least one component which is zero (corresponding to the measured component of $f_m$), eq. (3) can be rewritten $$\tau'_{ext} = J^T f_{nm} = J^T_{red} f_{nm,red} \quad (4)$$

where $f_{nm,red} \in \mathbb{R}^{6-N_{meas}}$ is a vector that contains all non-zero elements of $f_{nm}$ ($N_{meas}$ being the number of measured wrench components) and $J^T_{red}$ is a reduced version of the Jacobian transpose in which all columns corresponding to the measured components of wrench have been removed. Note that with $N_{DoF}$ being the number of manipulator degrees of freedom (DoF), $J^T_{red} \in \mathbb{R}^{N_{DoF} \times (6-N_{meas})}$. Hence, $J^T_{red}$ has more rows than columns. This redundancy allows to improve the quality of F/T estimation for the remaining (non-measured) components of wrench.

To this end, we assume that joint load estimates $\hat{\tau}_{ext}$ are available. They can e.g. be obtained from $$\hat{\tau}_{ext} = \tau_{mot} - G(q) - \tau_{ffw} - \hat{\tau}_{fric} \quad (5)$$

where $\tau_{mot}$ are motor torques, $G(q)$ are gravity induced torques, $\tau_{ffw}$ represents dynamic feedforward and $\hat{\tau}_{fric}$ are friction torques obtained from a friction model. Furthermore, we assume $$\hat{\tau}_{ext} = \tau_{ext} + e_j, e_j \sim N(0, \Sigma_j) \quad (6)$$

i.e. the error in joint load torque estimates is normally distributed with zero mean. Assuming that motor torques and gravity compensation are known very accurately, the covariance matrix $\Sigma_j$ can be obtained by determining the standard deviation in the friction model error for each joint (e.g. by gathering joint load torque estimates during a validation motion with no external load and a defined tool).

Considering (4) with the joint level uncertainty $e_j$ and an additional uncertainty $e_{fm} \sim N(0, \Sigma_{fm})$ in the low-dimensional F/T measurements from built-in sensors such as 10, we obtain $$\hat{\tau}_{ext} - J_{fm} f_m^T + e_j - J^T e_{fm} = \hat{\tau}'_{ext} + e_j - J^T e_{fm} = J^T_{red} f_{nm,red} \quad (7)$$

With this prior information in joint space, the remaining components of wrench can be estimated by maximum likelihood estimation as $$\tilde{f}_{nm,red} = (J_{red} \cdot (\Sigma_j + J^T \Sigma_{fm} J)^{-1} \cdot J_{red}^T)^{-1} \cdot J_{red} \cdot (\tau_j + J^T \Sigma_{fm} J)^{-1} \hat{\tau}_{ext} \quad (8)$$

This expression can be simplified under certain conditions, e.g. if the uncertainty of the measured components is neglected, $\Sigma_{fm} = 0$, equation (8) reduces to $$\hat{f}_{nm,red} = (J_{red} \cdot \Sigma_j^{-1} \cdot J_{red}^T)^{-1} \cdot J_{red} \cdot \Sigma_j^{-1} \hat{\tau}_{ext} \quad (9)$$

If no data on the covariance matrix $\Sigma$ are available, it can be necessary to replace it by an identity matrix $I_{N_{DoF}}$, implicitly assuming that the quality of the friction model is the same for all joints. Equation (9) then boils down to $$\hat{f}_{nm,red} = (J_{red} \cdot J^T_{red})^{-1} \cdot J_{red} \hat{\tau}_{ext} \quad (10)$$

which corresponds to the standard pseudo-inverse of the Jacobian transpose.

Alternatively, qualitative information with respect to the quality of the friction model can be used. To do so, the diagonal elements corresponding to main joints can be set to larger values than the elements corresponding to wrist joints (only the ratio of the elements matters for estimation).

According to a second approach for combining measured and calculated wrench component, a first estimate of wrench is calculated without regard to measurements, using the expression $$\tilde{f} = (J \cdot \Sigma_j^{-1} \cdot J_{red}^T)^{-1} \cdot J_{red} \cdot \Sigma_j^{-1} \hat{\tau}_{ext} \quad (11)$$

In a next step, a second estimate of wrench is calculated. In this step, all forces and torques that can directly be measured are replaced by the corresponding measurements. For non-measured directions, the original estimates are kept. This is formalized as $$\tilde{f}'_i = \begin{cases} f_{meas,i} & \text{if component } i \text{ is measured} \\ \tilde{f}_i & \text{if component } i \text{ is not measured} \end{cases} \quad (12)$$

A covariance matrix in Cartesian space is constructed as, $\Sigma_f = \text{diag}(\sigma^2_{fx}, \sigma^2_{fy}, \sigma^2_{fz}, \sigma^2_{\tau x}, \sigma^2_{\tau y}, \sigma^2_{\tau z})$, its diagonal elements being defined as $$\sigma_i^2 = \begin{cases} \sigma_{sens,i}^2 & \text{if component } i \text{ is measured} \\ \left(\frac{f_{max,i}}{3}\right)^2 & \text{if component } i \text{ is not measured} \end{cases} \quad (13)$$

wherein $\sigma_{sens,i}^2$ is the variance of the sensor 10 and $f_{max,i}$ is the maximum expected magnitude of the force or torque in direction i.

A refined estimate of the wrench is then obtained based on the first estimate of eq. (11) by a maximum a-posteriori estimation:

$$\hat{f} = (J \cdot \Sigma_j^{-1} \cdot J^T + \Sigma_f^{-1})^{-1} \cdot (J_{red} \Sigma_j^{-1} \hat{\tau}_{ext} + \Sigma_f^{-1} \tilde{f}) \quad (14)$$

According to a third approach, joint level load torque information $\tau_{exe}$ and the measurements gathered from a low-dimensional F/T sensor such as sensor 10 are combined into an augmented measurement vector y. This vector y has $N_{DoF} + N_{meas}$ components, $N_{DoF}$ being the number of degrees of freedom of the robot, and $N_{meas}$ being the number of measured components of the wrench. Movement of the robot is modelled by $$\begin{bmatrix} \dot{p} \\ \dot{f} \end{bmatrix} = \begin{bmatrix} 0 & J^T \\ 0 & 0 \end{bmatrix} \begin{bmatrix} p \\ f \end{bmatrix} + \begin{bmatrix} I \\ 0 \end{bmatrix} \tilde{\tau} \quad (15)$$

where $p = M\dot{q}$ is the generalized momentum and $\hat{\tau} = \tau_{mot} - G(q) - \tau_{ffw} - \hat{\tau}_{fric}$. The vector y is related to $$\begin{bmatrix} p \\ f \end{bmatrix}$$

by $$y = Cx = \begin{bmatrix} I & 0 \\ 0 & C_{sens} \end{bmatrix} \begin{bmatrix} p \\ f \end{bmatrix} \quad (16)$$

where $C_{sens}$ is a vector specifying which components of wrench directly be measured. For example, if force in z-direction can be measured, the vector is $C_{sens} = [0\ 0\ 1\ 0\ 0\ 0]$.

A Kalman filter is implemented that has $$x = \begin{bmatrix} p \\ f \end{bmatrix}$$

as its state vector. As usual in the art, the Kalman filter predicts a future state vector $x^{k+1}$ based on the current one $x^k$ using eq. 15. The prediction yields changes of both generalized momenta q and of wrench f. A discrepancies are calculated between the predicted and the measured values of the generalized momenta and of the at least one measured component $f_{m,1}$ of the wrench. These discrepancies are used for updating the status vector, as is common in the art, but as the amount of data is higher than in case of conventional prediction of forces and torques based on a dynamic model of the robot alone, without having recourse to force or torque measurements, precision is improved.

According to a fourth approach, in analogy to $\tau_{ext} = J^T f + e_j$, $e_j = N(0, \Sigma_j)$ we define an augmented Jacobian so that $$\begin{bmatrix} \tilde{\tau}_{ext} \\ f_{sens} \end{bmatrix} = \begin{bmatrix} J^T \\ C_{sens} \end{bmatrix} f + \begin{bmatrix} e_f \\ e_s \end{bmatrix} = J_{aug}^T f + e_{aug}, \quad (17)$$

$$e_{aug} \sim \mathcal{N}(0, \Sigma_{aug}), \Sigma_{aug} = \begin{bmatrix} \Sigma_j & 0 \\ 0 & \Sigma_s \end{bmatrix}.$$

where $e_s$ is the sensor measurement noise with covariance matrix $\Sigma_s$ and the matrix $c_{sens}$ describes the Cartesian directions (or linear combinations thereof) that are directly measured by a sensor such as 10. As in case of the first approach, a solution for eq. 17 is obtained by a maximum likelihood estimation, yielding $$\tilde{f} = (J_{aug} \cdot \Sigma_{aug}^{-1} \cdot J_{aug}^T)^{-1} \cdot J_{aug} \cdot \Sigma_{aug}^{-1} \cdot \begin{bmatrix} \tilde{\tau}_{ext} \\ f_{sens} \end{bmatrix}. \quad (18)$$

Eq. 18 provides estimates for all components of the wrench $\tilde{f}$, including those that are directly measured using sensor 10 or the like, so that by comparing the estimated values to the measured ones, reliability of the underlying model can be judged.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 robot arm
2 controller
3 base
4 end effector
5 link
6 joint 7 axis
8 drilling head
9 socket
10 sensor
11 TCP

What is claimed is:

1. A method for estimating a wrench acting on a reference point of a robot, comprising the steps of:
   a) measuring at least one component, but not all components, of the wrench; and
   b) estimating non-measured components of the wrench based on a dynamical model of the robot while taking into account the measured components,
   wherein step b) comprises a maximum-likelihood estimation of the non-measured components.

2. The method of claim 1, wherein a number of measured components is 1.

3. The method of claim 1, wherein the measured component is parallel to a surface normal of a surface of the robot which extends through the reference point or to a direction in which the reference point advances when processing a workpiece.

4. A method for estimating a wrench acting on a reference point of a robot, comprising the steps of:
   a) measuring at least one component, but not all components, of the wrench; and
   b) estimating non-measured components of the wrench based on a dynamical model of the robot while taking into account the measured components,
   wherein step b) comprises calculating a first estimate of the wrench based on the dynamical model alone, and refining the first estimate using a maximum-a-posteriori estimation.

5. The method of claim 4, wherein a number of measured components is 1.

6. The method of claim 4, wherein the measured component is parallel to a surface normal of a surface of the robot which extends through the reference point or to a direction in which the reference point advances when processing a workpiece.

7. A method for estimating a wrench acting on a reference point of a robot, comprising the steps of:
   a) measuring at least one component, but not all components, of the wrench; and
   b) estimating non-measured components of the wrench based on a dynamical model of the robot while taking into account the measured components,
   wherein the wrench is predicted by a Kalman filter and the at least one measured component is input as a state measurement into the Kalman filter.

8. The method of claim 7, wherein a number of measured components is 1.

9. The method of claim 7, wherein the measured component is parallel to a surface normal of a surface of the robot which extends through the reference point or to a direction in which the reference point advances when processing a workpiece.

10. A method for estimating a wrench acting on a reference point of a robot, comprising the steps of:
    a) measuring at least one component, but not all components, of the wrench; and
    b) estimating non-measured components of the wrench based on a dynamical model of the robot while taking into account the measured components,
    wherein among the measured components of the wrench there is at least one force component and/or among the non-measured components there is at least one torque component.

11. The method of claim 10, wherein a number of measured components is 1.

12. The method of claim 10, wherein the measured component is parallel to a surface normal of a surface of the robot which extends through the reference point or to a direction in which the reference point advances when processing a workpiece.

* * * * *